D. KENNER.

MOP.

APPLICATION FILED NOV. 6, 1920.

Reissued Jan. 24, 1922. 15,274.

Inventor
Duncan Kenner.

By Gordon and Stewart
Attorneys

UNITED STATES PATENT OFFICE.

DUNCAN KENNER, OF NEW ORLEANS, LOUISIANA.

MOP.

15,274. Specification of Reissued Letters Patent. Reissued Jan. 24, 1922.

Original No. 1,279,355, dated September 17, 1918, Serial No. 214,890, filed February 1, 1918. Application for reissue filed November 6, 1920. Serial No. 422,379.

*To all whom it may concern:*

Be it known that I, DUNCAN KENNER, a citizen of the United States, and a resident of New Orleans, in the parish of Orleans and State of Louisiana, have invented a new and Improved Mop, of which the following is a full, clear, and exact description.

This invention relates to brushing and scrubbing, and has particular reference to mops.

Among the objects of the invention is to provide an improved type of mop that may be effectively cleansed and wrung by hand operation, but without requiring the wetting or soiling of the operator's hands.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of my improved mop showing in full lines the normal operative position of the head and in dot and dash lines the position of the head for wringing.

Fig. 2 is a vertical sectional view.

Fig. 3 is a side elevation showing the wringing position; and

Figure 4:
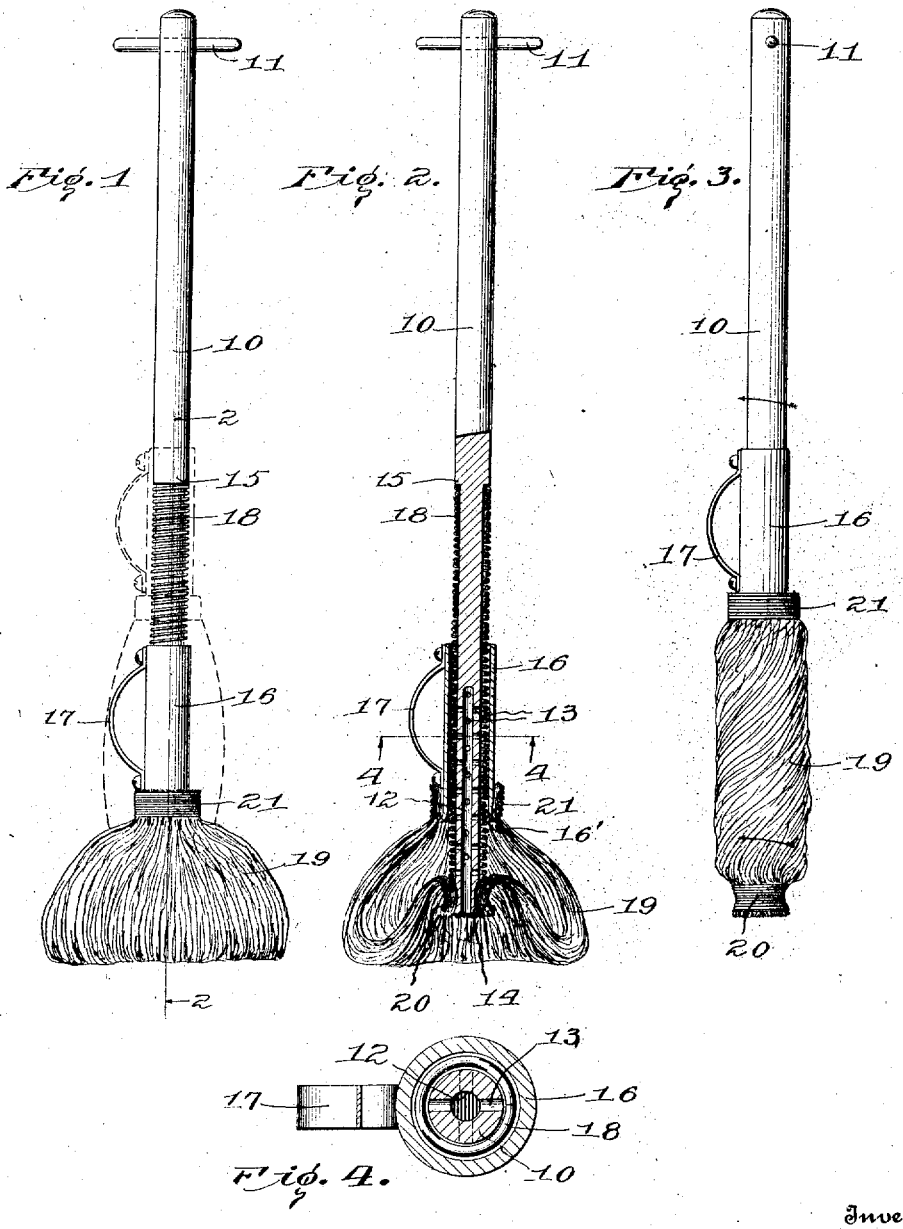
Fig. 4 is a horizontal sectional detail on the line 4—4 of Fig. 2.

My improved mop comprises a straight rigid handle 10 of any suitable material and proportions. At the upper end of the handle may be fixed any suitable crosshead 11, or its equivalent, to facilitate the twisting or wringing action referred to below. The lower end of the handle is provided with a central longitudinal bore 12 which may extend for eight or ten inches along the handle from the extreme lower end thereof, and communicating with this bore 12 are any desired number of lateral or radial holes 13. The extreme end of the handle is preferably grooved circumferentially at 14, but the remaining portion of the handle is preferably straight or cylindrical although it may be shouldered at 15 where the smaller lower cylindrical end portion merges into the larger cylindrical end portion.

16 indicates a hollow cylindrical or tubular member fitted loosely over the lower end of the handle. This member is made preferably of metal or other suitable rigid material and is provided at its lower end with a flaring flange 16′. Above the flared lower end of the sleeve I may attach a loop or bail 17 to assist the operator in holding the member stationary during the wringing action.

Within the member or between the member and the lower end of the handle 10 is located a coil spring 18. The lower end of the spring is fitted in the groove 14 while all the remaining portion of the spring is simply fitted loosely or slidably upon the handle up to the shoulder 15. The spring therefore constitutes in effect an open mesh sleeve applied to or fitted over the hollow end of the handle.

The mop head or mop material 19 consists of any suitable fibrous mass of material of a nature suitable for the purpose of the device, the mass being arranged in the form of a hollow cylinder with respect to the lower end of the handle. One end of the head is wrapped securely at 20 adjacent to the end of the coil 18 next to the groove 14 whereby the end of the head will be secured to the handle and at the same time the end of the spring will be supported. The upper end of the head is secured as by wrapping at 21 around the flanged or flaring end of the member 16 whereby this end of the head is either held stationary with the member or is caused to partake of any movement that may be imparted to the member either longitudinally or circumferentially with respect to the handle.

In the operation of the mop which is or may be substantially the same as any other ordinary mop so far as its cleansing action is concerned, the member 16 and the upper end of the head secured thereto occupies a position as indicated in Fig. 2 or perhaps lower down toward the end of the handle, the main or middle portion of the head thus extending or bagging below the ends of the handle and member. In the cleansing and wringing of the mop the operation is preferably as follows: With the left hand for instance grasping the upper portion of the member 16 and with the fingers extending beneath the bail 17 and with the other hand grasping the upper end of the handle at the pin or crosshead 11 the operator will extend the left hand downward so that the head 19 will be in a loose pliable condition where it may be thoroughly rinsed and shaken to properly position the fibers thereof while loose. The operator then maintaining the same grasp upon the member 16 will draw the same upward, covering the upper portion of the spring 18 and exposing the lower portion of the spring so that the inner surface of the mass of the fibrous head will bear directly against it. The operator now holds the left hand stationary and imparts a rotation to the handle with the other hand as for instance in the direction indicated in Fig. 3 whereby the head is put into a hard twist causing the water to be squeezed therefrom. Naturally the water on the outside of the head drains directly therefrom and the water from the inner portion of the head drains freely through the spring or between the coils thereof and thence through the radial holes 13 into and inward through the bore 12. The coil spring acts as a flexible core and the fibrous strands of the head are wrung thereover or against the same as if the handle were not present. It will be appreciated that if the head were twisted or wrapped upon an imperforate handle the water from the interior of the head would be largely retained therein. However, the presence of the spring 18 holds the mop material away from the handle and provides for the ready drainage of the refuse water. Furthermore the spring conforms automatically to the handle around which it is coiled, and inasmuch as the head in the upwardly extended position prior to the twisting or wringing action bears directly against the spring it follows that while the head naturally shortens while twisting a portion of the coil spring gripped thereby also will shorten somewhat, but in no event will the spring intercept the free discharge of the water from the interior of the head along the surface of the handle or through the bore 12.

I claim:

1. In a mop, the combination of a handle having a longitudinal bore at one end and a plurality of lateral holes leading outward from said bore, a pervious sleeve surrounding the portion of the handle having the bore and holes, textile mop material having one portion thereof secured to the end of the handle having the bore, a hand grip movably mounted upon the aforesaid sleeve, and means securing the other end of the material to said hand grip.

2. In a mop, the combination of a handle having a bore extending from the lower end thereof and having lateral holes leading outward from said bore to the surface of the handle, a wire coil surrounding the portion of the handle having the bore and holes, a tubular member loosely fitted over the coil and movable with relation to the handle and coil both longitudinally and circumferentially, and textile mop material surrounding the end of the handle having the bore and secured at its opposite ends to the end of the handle and to said tubular member respectively.

3. In a mop, the combination of a handle, a pervious sleeve surrounding a portion of the handle, mop material having one portion thereof secured to the end of the handle, a hand grip movably mounted upon the aforesaid sleeve, and means securing the other end of the material to said hand grip.

4. In a mop, the combination of a handle, a wire coil surrounding a portion of the handle, a tubular member loosely fitted over the coil and movable with relation to the handle and coil both longitudinally and circumferentially, and mop material surrounding the end of the handle and secured at its opposite ends to the end of the handle and to said tubular member respectively.

5. In a mop, the combination of a handle, a pervious sleeve surrounding a portion of the handle and attached to one end of the same, mop material having one portion thereof secured to the said end of the handle, a hand grip movably mounted upon the aforesaid sleeve, and means securing the other end of the head to said hand grip.

6. In a mop, the combination of a handle, a resilient helix loosely surrounding a portion of the handle and secured by an end to the end of the handle, mop material having a portion thereof covering the jointure of helix and handle, a hand grip secured to the opposite end of the mop material and movable over the helix.

In witness whereof, I hereunto affix my signature.

DUNCAN KENNER.